H. DIFLO.
THREADING CHUCK.
APPLICATION FILED DEC. 16, 1912.
1,068,227.
Patented July 22, 1913.
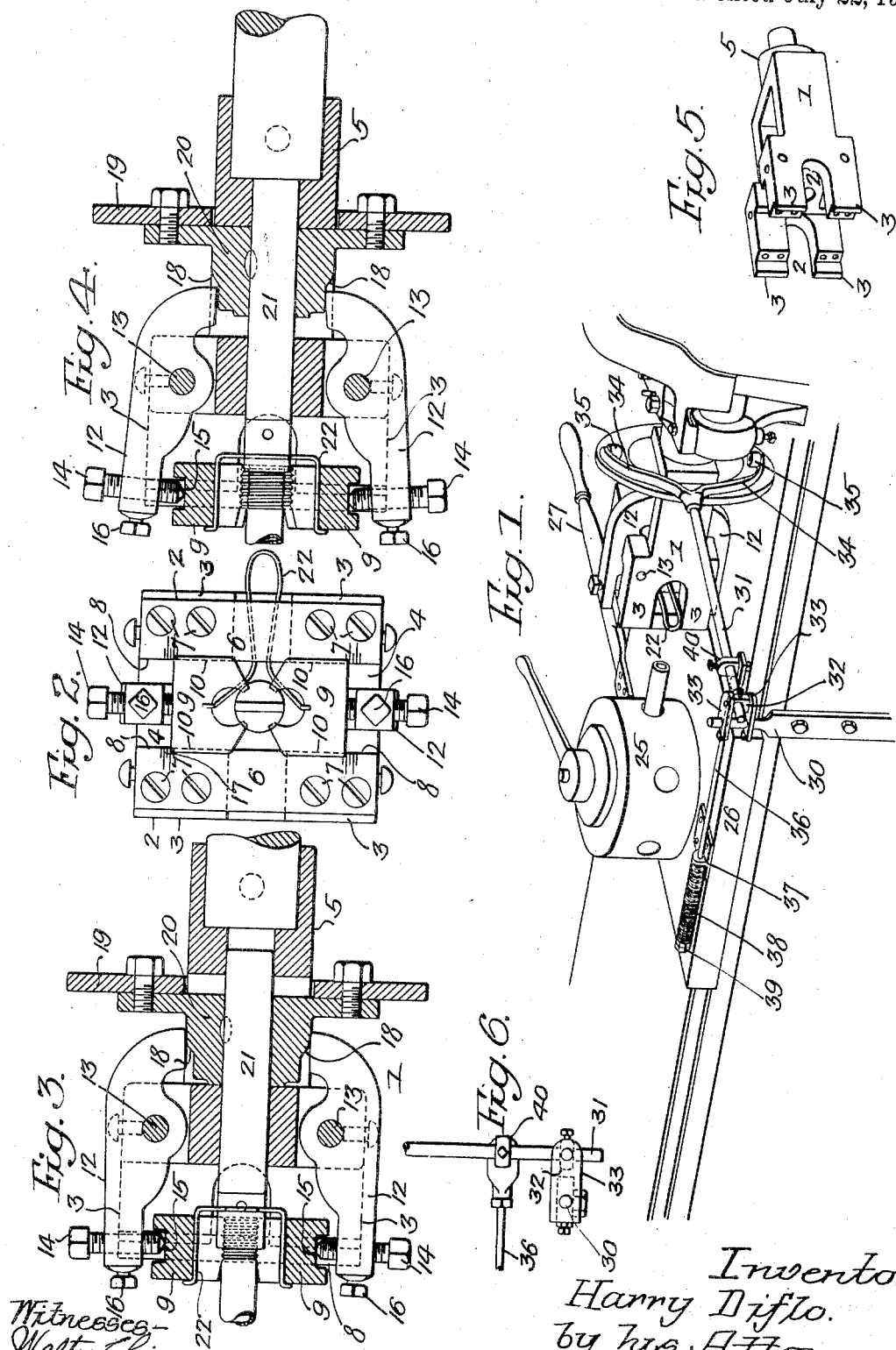
Inventor
Harry Diflo.
by his Attorneys
Howson & Howson

UNITED STATES PATENT OFFICE.

HARRY DIFLO, OF PHILADELPHIA, PENNSYLVANIA, ASSIGNOR OF ONE-FOURTH TO THOMAS T. JONES AND ONE-FOURTH TO WILLIAM WECKESSER, BOTH OF PHILADELPHIA, PENNSYLVANIA.

THREADING-CHUCK.

1,068,227.   Specification of Letters Patent.   Patented July 22, 1913.

Application filed December 16, 1912.   Serial No. 737,088.

*To all whom it may concern:*

Be it known that I, HARRY DIFLO, a citizen of the United States, residing in Philadelphia, Pennsylvania, have invented certain Improvements in Threading-Chucks, of which the following is a specification.

My invention relates to screw-cutting devices designed for the threading of small parts, pipes, bolts, rods, and the like, but more particularly adapted for threading small pipe sections, and one object of my invention is to provide a structure that is automatic in its operation of releasing the die from engagement with the threaded work at a predetermined time so that there will be no unnecessary action of the threading die upon the work operated upon.

A further feature of my invention is to facilitate the restoration of the parts of the chuck to the active position easily and without shock to the machine or the die carrying chuck, and without danger of dislocating the effective position of the latter.

These and other features of my invention will be more fully described hereinafter, reference being had to the accompanying drawings, in which:

Figure 1, is a perspective view of the structure forming the subject of my invention in the position of actual use; Fig. 2, is a front elevation of the same; Fig. 3, is a sectional view on the line 3—3, Fig. 2, showing the threading dies of the chuck in the active position; Fig. 4, is a similar sectional view showing the threading dies in the open position; Fig. 5, is a detached perspective view of the chuck without its attached parts, and Fig. 6, is a view illustrating a detail of my invention.

In the drawings, 1 represents a suitable head made up of a pair of bifurcated jaws 2; such head having practically four posts or projections which form between them recesses or ways 4 for the reception of various elements which go to make up the finished structure.

The head is carried by a suitable stem 5, which may be mounted upon the spindle of an ordinary lathe, to which spindle rotative movement may be imparted in any usual or well known manner. Carried by the posts 3 forming the jaws of the head are a pair of plates 6, preferably of hardened metal, tool steel for instance, which are secured to said jaws by suitable means, such as screws 7, and these plates have edges 8 which project inwardly with respect to the jaws for the reception of a pair of threading dies 9, having grooves 10 at each side fitting said edges, which dies are retained in place by a pair of levers 12 pivoted at 13; said levers having adjustable positioning screws 14 at their ends in engagement with said dies, and the latter may be recessed at 15 to provide seats for the ends of said screws. These screws are adjustable to vary the extent of opening of the dies, and when adjusted are held by set screws 16. In order that the threading dies may be accurately set to perform a proper threading action uniformly upon work of the same size and character, the plates 6 are provided with scale marks, as indicated at 17.

The rear ends of the levers 12 are in engagement with a pair of cams 18 carried with the head and movable with respect thereto. Secured to these cams so as to move therewith is a plate 19, and by means of mechanism hereinafter described, such plate is moved to effect movement of the cams under certain conditions. Secured to a block 20 carrying these cams is an axially disposed rod or bar 21 which normally lies with its outer end between the jaws of the threading dies, and by preference a suitable spring 22 is provided in engagement with said jaws for a purpose to be described; the normal tendency of said spring being to separate said threading dies.

Upon introducing the pipe or other element to be threaded into engagement with the threading dies, the normal threading action will take place, and as it progresses the end of the object being threaded will engage and push forward the axially alined rod or bar 21. This rod or bar being connected to the block 20 having the cams 18, the latter will be moved, and such movement of the cams releasing the ends of the levers which hold the threading jaws in their active position, said jaws will be sprung apart by the action of the spring 22. The work is then released, the threading jaws restored to their active position by movement of the cam block, and a fresh piece is then inserted and the threading operation proceeds as before. To effect this resetting of the threading dies, the following means are preferably employed: The pipe or other element to be threaded may be carried by a suitable turret, indicated at 25, having the usual means for securing such element thereto, and this turret is mounted upon a slide plate 26 adapted to suitable ways on the bed-plate of the machine. To move the plate carrying the turret, a handle 27 may be employed, and such turret, of course, is always moved outwardly or away from the threading elements when a fresh piece of work is to be inserted. I make use of this necessary movement of the turret for the placement of the work to reset the jaws; the following mechanism being preferably employed: Carried by the bed-plate of the machine, is a post 30, to the upper end of which an arm 31 is pivotally connected; said arm being slidably adjustable in a block 32 pivoted in arms 33 adjustably secured to the post 30. The arm 31 carries at its opposite end a yoke 34 with rollers 35 bearing against the disk or plate 19 attached to the cam block. This arm 31 is further pivotally connected to a rod 36 passing through a suitable supporting bracket 37 carried by the slide upon which the turret is mounted, with a spring 38 interposed between such bracket mount and a nut or other stop 39 at the end of said rod. The rod 36 is pivoted to a block 40 slidably adjustable on the arm 31. The parts being organized in this manner, it will be noted that rearward movement of the slide carrying the turret for the purpose of removing the finished and resetting a fresh piece of work will cause the arm 31 with the yoked end 34 to be thrown into engagement with the plate 19, shifting the block carrying the cams which, by engagement with the levers, throw the threading dies into proper position for engagement with the next piece inserted.

An important feature of my invention is the character of the open head carrying the threading dies and the levers for operating the same, which is clearly shown in Fig. 5. Under ordinary circumstances, the parts of the usual threading chuck of this character become clogged with cuttings, preventing proper operation of the structure, cause undue friction and wear, and tear the threads. These difficulties are so constant a factor of objection that it is frequently impossible to operate the ordinary threading chucks without taking them apart at regular intervals to remove the cuttings. In the operation of structures of this character, the cutting is effected while a constant stream of lubricant is directed to the cutting point, and unless the head carrying the several elements be relatively unencumbered for the rapid dissipation or discharge of such oil and cuttings, it will get out of order. The head which I have devised, clearly shown in Fig. 5, is so open and free from unnecessary inclosures and parts that it is practically self-cleaning; a condition aided by the centrifugal action of the same. This is a very important feature of my invention.

The threading die closing attachment connected to the bed of the lathe and the slide of the turret or tail stock is so arranged that when the latter is moved back for the removal of one piece and the resetting of another piece to be threaded, the rollers on the yoke engage the circular disk on the chuck, shifting the cam block and operating the levers to restore the cutting jaws to the active position. This closing attachment has a spiral spring on the closing rod to reduce the hard knocks and act as a cushion between the slide and chuck so that the operator need pay no attention to the manner in which the slide is withdrawn, thereby saving wear and tear on chuck and machine. The closing attachment is adjustable in all directions, and can be fitted to any style of machine.

By preference, I interpose a fiber or leather washer between the end of the set screw 16 and the threads of the positioning screws 14, in order to protect the latter and insure proper operation of the same when adjustments are made.

I claim:

1. The combination, in a threading chuck, of a head having an open forked end, threading dies carried by the forks of said end, the opening between the forks extending in rear of said dies to form substantially an unobstructed passage for the rapid discharge of cuttings, levers pivotally mounted in said head for holding said dies in the active position, means in engagement with said levers whereby the dies may be maintained in an active position, means tending to separate the dies, and means automatically operated during the threading operation for releasing the lever holding means.

2. The combination, in a threading chuck, of a head having an open forked end, threading dies carried by the forks of said end, the opening between the forks extending in rear of said dies to form substantially an unobstructed passage for the rapid discharge of cuttings, levers pivotally mounted in said head for holding said jaws in the active position, a movable part in engagement with said levers whereby the jaws may be maintained in an active position, means tending to separate the jaws, and means automatically operated during the threading operation for releasing the lever holding means.

3. The combination, in a threading chuck, of a head having an open forked end, threading dies slidably mounted in the forks of said end, the space formed between the forks extending beyond the inner end of the dies to form substantially an unobstructed passage for the rapid discharge of cuttings, levers pivotally mounted in said head at right angles to said dies for holding the same in the active position, a movable part in engagement with said levers whereby the dies are maintained in an active position when said part is in one position and permitting opening of the dies when in another position, and means automatically operated during the threading operation for sliding the lever holding means to release the threading dies.

4. The combination, in a threading chuck, of a head having an open forked end, threading dies slidably mounted in the forks of said end, the space formed between the forks extending beyond the inner end of the dies to form substantially an unobstructed passage for the rapid discharge of cuttings, levers pivotally mounted in said head at right angles to said dies for holding the same in the active position, a movable part in engagement with said levers whereby the dies are maintained in an active position when said part is in one position and permitting opening of the dies when in another position, means tending to separate the jaws, and means automatically operated during the threading operation for sliding the lever holding means to release the threading dies.

In testimony whereof, I have signed my name to this specification, in the presence of two subscribing witnesses.

HARRY DIFLO.

Witnesses:
MURRAY C. BOYER,
WM. A. BARR.

---

Copies of this patent may be obtained for five cents each, by addressing the "Commissioner of Patents, Washington, D. C."